(12) United States Patent
Harper

(10) Patent No.: US 12,336,517 B2
(45) Date of Patent: Jun. 24, 2025

(54) WATER DISPENSER

(71) Applicant: Doskocil Manufacturing Company, Inc., Arlington, TX (US)

(72) Inventor: Michael Harper, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 18/109,662

(22) Filed: Feb. 14, 2023

(65) Prior Publication Data
US 2023/0276770 A1    Sep. 7, 2023

Related U.S. Application Data

(60) Provisional application No. 63/316,738, filed on Mar. 4, 2022.

(51) Int. Cl.
*A01K 7/02*    (2006.01)
*A01K 7/00*    (2006.01)

(52) U.S. Cl.
CPC .............. *A01K 7/02* (2013.01); *A01K 7/005* (2013.01)

(58) Field of Classification Search
CPC . A01K 7/00; A01K 7/005; A01K 7/02; A01K 7/025; A01K 7/0225
See application file for complete search history.

(56) References Cited

U.S. PATENT DOCUMENTS

| | | | | |
|---|---|---|---|---|
| D289,808 S | * | 5/1987 | Gardner | D30/122 |
| 4,840,143 A | * | 6/1989 | Simon | A01K 5/0225 |
| | | | | 43/131 |
| D316,382 S | * | 4/1991 | Lorenzana | D30/129 |
| 5,799,609 A | * | 9/1998 | Burns | A01K 7/02 |
| | | | | 119/74 |
| D578,255 S | * | 10/2008 | Walsh | D30/129 |
| 9,137,967 B2 | * | 9/2015 | Lathim | A01K 5/0225 |
| 2011/0114026 A1 | * | 5/2011 | Lathim | A01K 7/02 |
| | | | | 119/72 |
| 2011/0239950 A1 | * | 10/2011 | Harper | A01K 7/02 |
| | | | | 119/74 |
| 2012/0017839 A1 | * | 1/2012 | Veness | A01K 7/00 |
| | | | | 119/74 |
| 2015/0096649 A1 | * | 4/2015 | Lathim | A01K 7/02 |
| | | | | 141/324 |

FOREIGN PATENT DOCUMENTS

| | | | | |
|---|---|---|---|---|
| DE | 202009013837 U1 | * | 3/2010 | A01K 39/012 |
| GB | 2241633 B | * | 4/1994 | A01K 7/02 |

* cited by examiner

*Primary Examiner* — Peter M Poon
*Assistant Examiner* — Hae Rie Jessica Byun
(74) *Attorney, Agent, or Firm* — Foley & Lardner LLP

(57) ABSTRACT

A water dispenser includes a bottle support area, a bowl and a channel. The bottle support area has a nozzle receiving portion defined by a circular sidewall that is configured to abut a nozzle of a water bottle. The bowl is fluidly connected to the bottle support area. The channel has a pair of first and second sidewalls extending from the nozzle receiving portion to the bowl to fluidly connect the nozzle receiving portion and the bowl. The channel has a maximum diameter that is less than a maximum diameter of the nozzle receiving portion. The channel further includes a pair of first and second protrusions extending from the first and second sidewalls of the channel towards each other. The first and second protrusions define a minimum diameter of the channel.

12 Claims, 8 Drawing Sheets

WATER DISPENSER

CROSS-REFERENCE TO RELATED APPLICATIONS

This application claims priority to Provisional U.S. Patent Application No. 63/316,738, filed on Mar. 4, 2022. The entire disclosure of Provisional U.S. Patent Application No. 63/316,738 is hereby incorporated herein by reference.

BACKGROUND

Field of the Invention

The present disclosure generally relates to a water dispenser. More specifically, the present disclosure relates to a water dispenser designed to be a base to accommodate large gallon water bottles.

Background Information

Conventional gravity-type water dispensers in the pet product field include both a base and a corresponding water bottle that is specially sized and dimensioned to be fitted with the base. In other words, conventional water dispensers in the pet product field are sold as a set having both a base and a water bottle specially designed to be used with the base.

SUMMARY

In view of the state of the known technology, one aspect of the present disclosure is to provide a water dispenser comprising a bottle support area, a bowl and a channel. The bottle support area has a nozzle receiving portion defined by a circular sidewall that is configured to abut a nozzle of a water bottle. The bowl is fluidly connected to the bottle support area. The channel has a pair of first and second sidewalls extending from the nozzle receiving portion to the bowl to fluidly connect the nozzle receiving portion and the bowl. The channel has a maximum diameter that is less than a maximum diameter of the nozzle receiving portion. The channel further includes a pair of first and second protrusions extending from the first and second sidewalls of the channel towards each other. The first and second protrusions define a minimum diameter of the channel Also other objects, features, aspects and advantages of the disclosed water dispenser will become apparent to those skilled in the art from the following detailed description, which, taken in conjunction with the annexed drawings, discloses one embodiment of the water dispenser.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
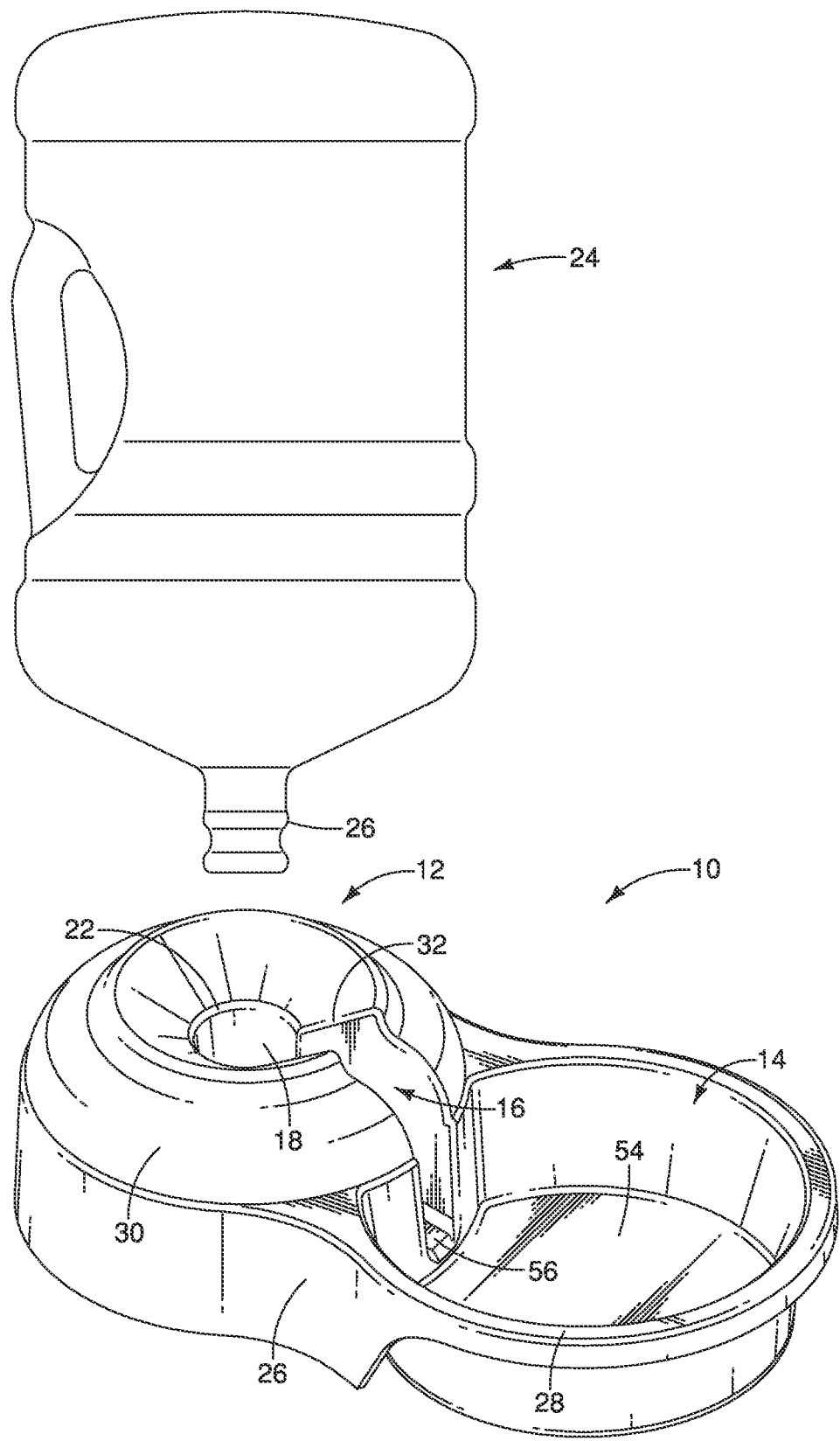
FIG. 1 is a top perspective view of a water dispenser and a water bottle in accordance with an illustrated embodiment.
Figure 2:
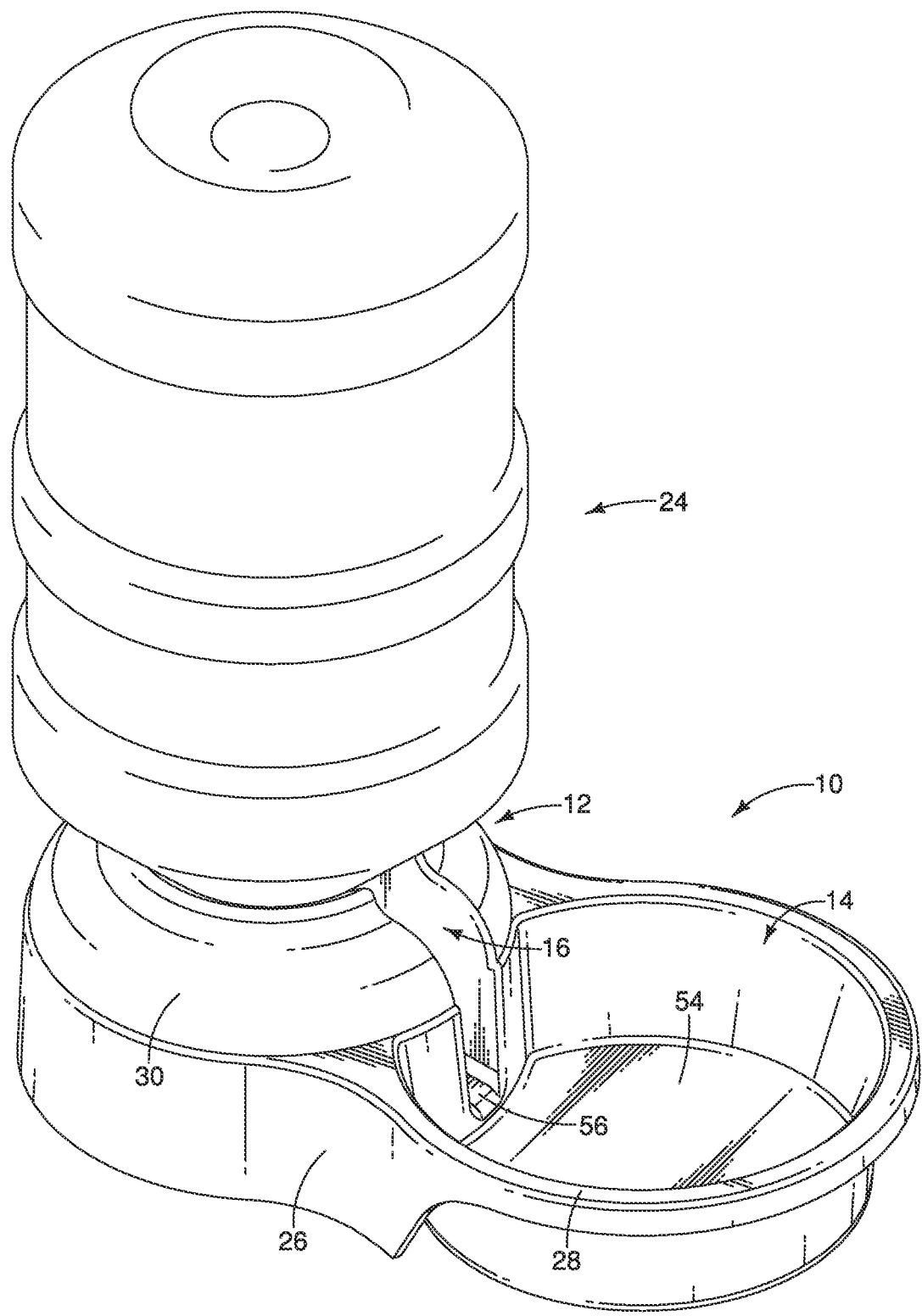
FIG. 2 is a top perspective view similar to FIG. 1, but with the water bottle positioned on the water dispenser.
Figure 3:
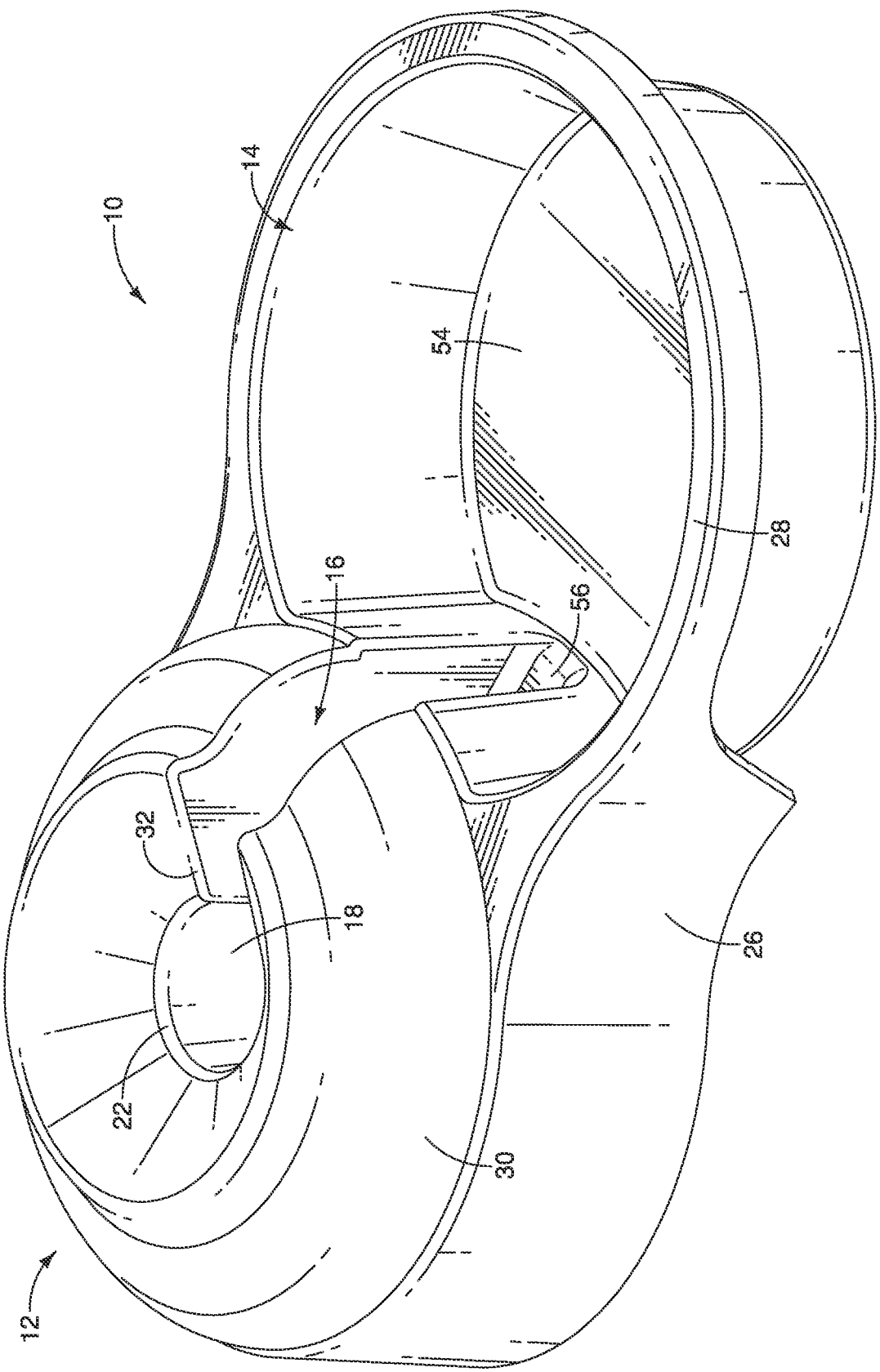
FIG. 3 is a top perspective view of the water dispenser.

Referring initially to FIGS. 1 and 2, a water dispenser 10 comprises a bottle support area 12, a bowl 14 and a channel 16 in accordance with an illustrated embodiment. The bottle support area 12, the bowl 14 and the channel 16 are fluidly connected with one another. The water dispenser 10 is designed to serve as a gravity water feeder. In particular, the water dispenser 10 is designed as a base to support a conventional large (approximately five gallon) water bottle (e.g., the water bottle 24 shown) for dispensing fluid from the water bottle 24 into the bowl 14. However, it is noted that the bottle support area 12 is capable of supporting a variety of water bottle sizes including more or less than five gallon bottles.

In particular, fluid received from the bottle 24 through the bottle support area 12 flows from the bottle support area 12, through the channel 16 into the bowl 14, as will be further described. In the illustrated embodiment, the water dispenser 10 is designed to accommodate conventional large water bottles that are conveniently found at third party vendors, such as feed stores, grocery stores or supermarkets. Conventional water dispensers in the pet product field include both a waterer (e.g., a base) and a corresponding water bottle that is specially sized and dimensioned to be fitted with the base. In other words, conventional water dispensers in the pet product field include both a base and a water bottle.

The water dispenser 10 of the illustrated embodiment is provided without a corresponding bottle. Rather, the water dispenser 10 of the illustrated embodiment is provided to be compatible with readily available water bottles that can be found at stores by the user. In this way, the water dispenser 10 can be compatible with five (5) gallon bottles, whereas conventional gravity water dispensers in the pet product field accommodate four (4) gallon bottles or other sized bottles. As the water dispenser 10 does not need to be provided with a bottle, the water dispenser 10 of the illustrated embodiment can be sold at a cheaper price than traditional gravity waterers. The water dispenser 10 of the illustrated embodiment is also more convenient to ship than the traditional gravity waterers that include a bottle.

Figure 5:
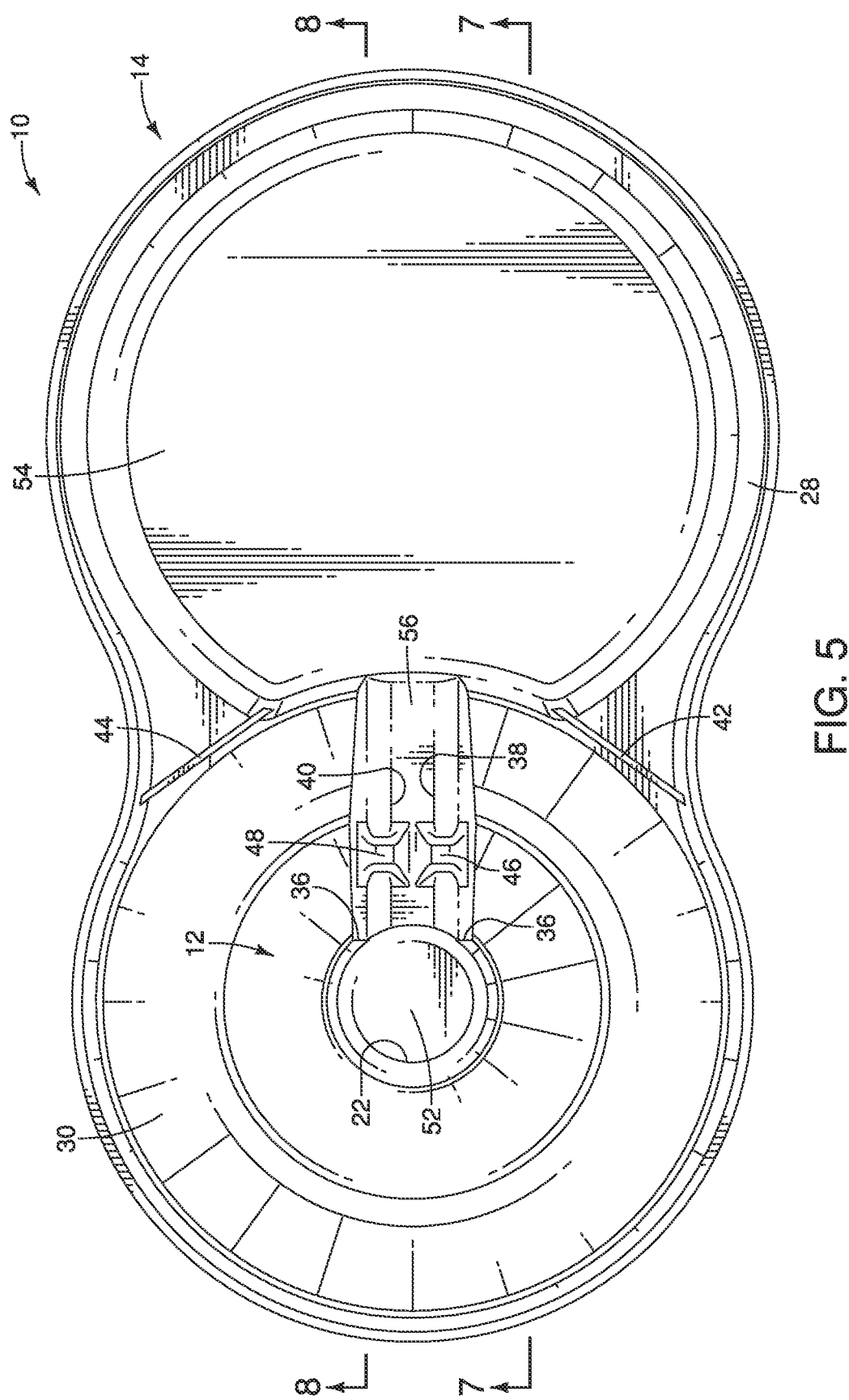
FIG. 5 is a top plan view of the water dispenser of FIGS. 1 to 4.

The bottle support area 12 has a nozzle receiving portion 18 that is configured to abut a nozzle 20 of a water bottle 24. As seen in FIGS. 1 and 5, the nozzle receiving portion 18 is defined by a circular sidewall 22 that receives the nozzle 20 of the water bottle 24. In particular, the nozzle receiving portion 18 includes an opening that defines an inlet for receiving fluid into the water dispenser 10. The circular sidewall 22 is shaped and dimensioned to accommodate conventional five (5) gallon bottlenecks. As can be seen in FIGS. 1 and 2, the circular sidewall 22 is generally arcuate. That is, the circular sidewall 22 defines a circular shaped interior of the bottle receiving portion 18 that substantially corresponds to a shape of a conventional water bottle neck. Therefore, the circular sidewall 22 is configured to abut the upper portion of the water bottle 24. Thus, the water bottle 24 is further supported by the bottle support area 12 reducing the likelihood of the water bottle 24 moving or becoming dislodged.

While it can be understood that generally 5 gallon water bottles have necks that have substantially the same diameter, different bottle manufacturers make bottle necks having different lengths. Thus the waterer described herein is designed to accommodate different lengths of bottle necks. Water bottles with shorter necks can cause a building of water in the receiving portion 18 of the waterer causing water to flow through the V-shaped channel 16 at a fast rate. This fast flow rate of water can cause significant turbulence in the bowl 14. Therefore, the present water dispenser 10 is provided with a V-shaped channel 16 to help prevent too much waterflow from the nozzle receiving portion 18 to the bowl 14. This configuration also prevents sloshing of water in the bowl 14.

The bottle support area 12 has a diameter that is generally the same diameter as the outer diameter of a generic 5 gallon water bottle. Thus, the bottle support area 12 prevents the water bottle 24 from tilting and supports the water bottle 24 in a vertical manner.

As best seen in FIGS. 3 to 6, the water dispenser 10 further comprises an exterior wall 26 connecting the bottle support area 12 and the bowl 14. The exterior wall 26 defines an outer sidewall of the bottle support area 12. The exterior wall 26 extends from the bottle support area 12 to the bowl 14 to define a rim 28 of the bowl 14. Therefore, the exterior sidewall 26 is contiguous with the rim 28 (or a collar) of the bowl 14. Preferably, the rim 28 is approximately three-eighths inch in thickness to help prevent water sloshing from the bowl 14 during pet use.

The bottle support area 12 further includes a bottle collar 30 extending upwardly from the outer sidewall of the bottle support area 12. The bottle collar 30 has dome-like exterior shape and a tapering wall extending from the bottle collar 30 to the inlet of the nozzle receiving portion 18. The shape of the bottle collar 30 having the dome-like outer shape that the tapering wall helps distribute the weight of the water bottle along the bottle collar 30. The shape of the tapering wall also helps retain the water bottle onto the bottle support area 12. Preferably, the exterior of the bottle collar 30 is textured.

Figure 6:
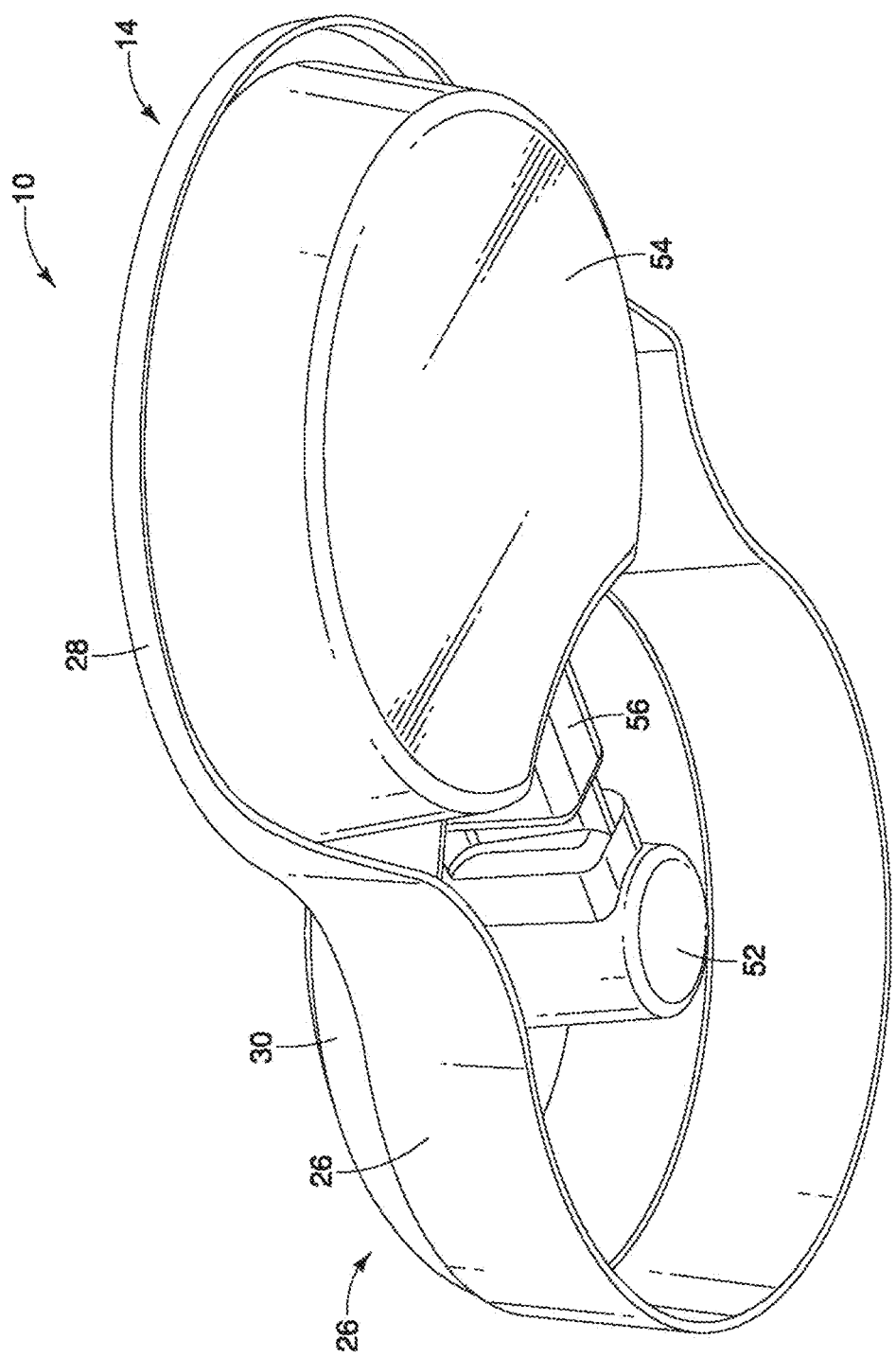
FIG. 6 a bottom perspective view of the water dispenser of FIGS. 1 to 5.

As seen in FIGS. 1, 5 and 6, the bottle collar 30 has a radial break 32 defined by a first break wall 34 and a second break wall 36. The first break wall 34 of the bottle collar 30 is integrally connected to a first sidewall of the channel 16. The second break wall 36 is integrally connected to a second sidewall of the channel 16. That is, the bottle collar 30 has an opening that leads to the channel 16 between the bottle support area 12 and the bowl 14. As stated, the bottle support area 12, the bowl 14 and the channel 16 are blown molded as a one-piece member. Preferably, the bottle support area 12, the bowl 14 and the channel 16 are blown molded from plastic. Traditional waterers are two-piece with the bowl 14 portion separately made from the bottle support portion such that the separate portions need assembly. Given this arrangement, the water dispenser 10 of the current embodiment can be stacked and shipped for inventory purposes.

Referring now to FIG. 5, the water dispenser 10 further comprises a pair of first and second interior reinforcement walls 42 and 44. The first interior reinforcement wall 42 extends from an inside of the outer sidewall to the bowl 14 from a first side of the outer sidewall. The second interior reinforcement wall 44 extends from the inside of the outer sidewall wall to the bowl 14 from a second side of the outer sidewall. The first and second interior reinforcement walls 42 and 44 help support the weight of the bottle 24 and helps redistribute the weight of the bottle 24 from the bottle support area 12 to the rest of the water dispenser 10.

Figure 4:
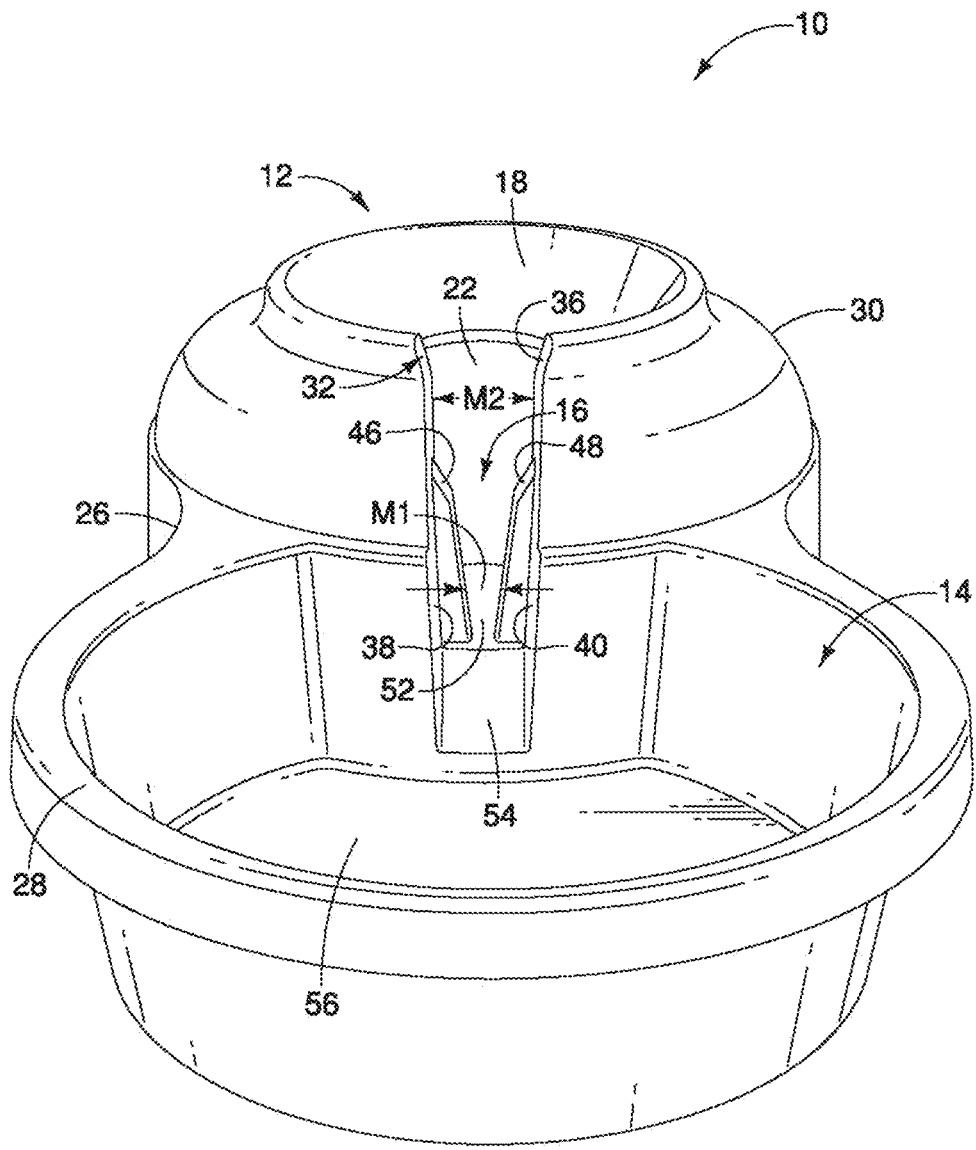
FIG. 4 is a front elevational view of the water dispenser of FIGS. 1 to 3.
Figure 7:
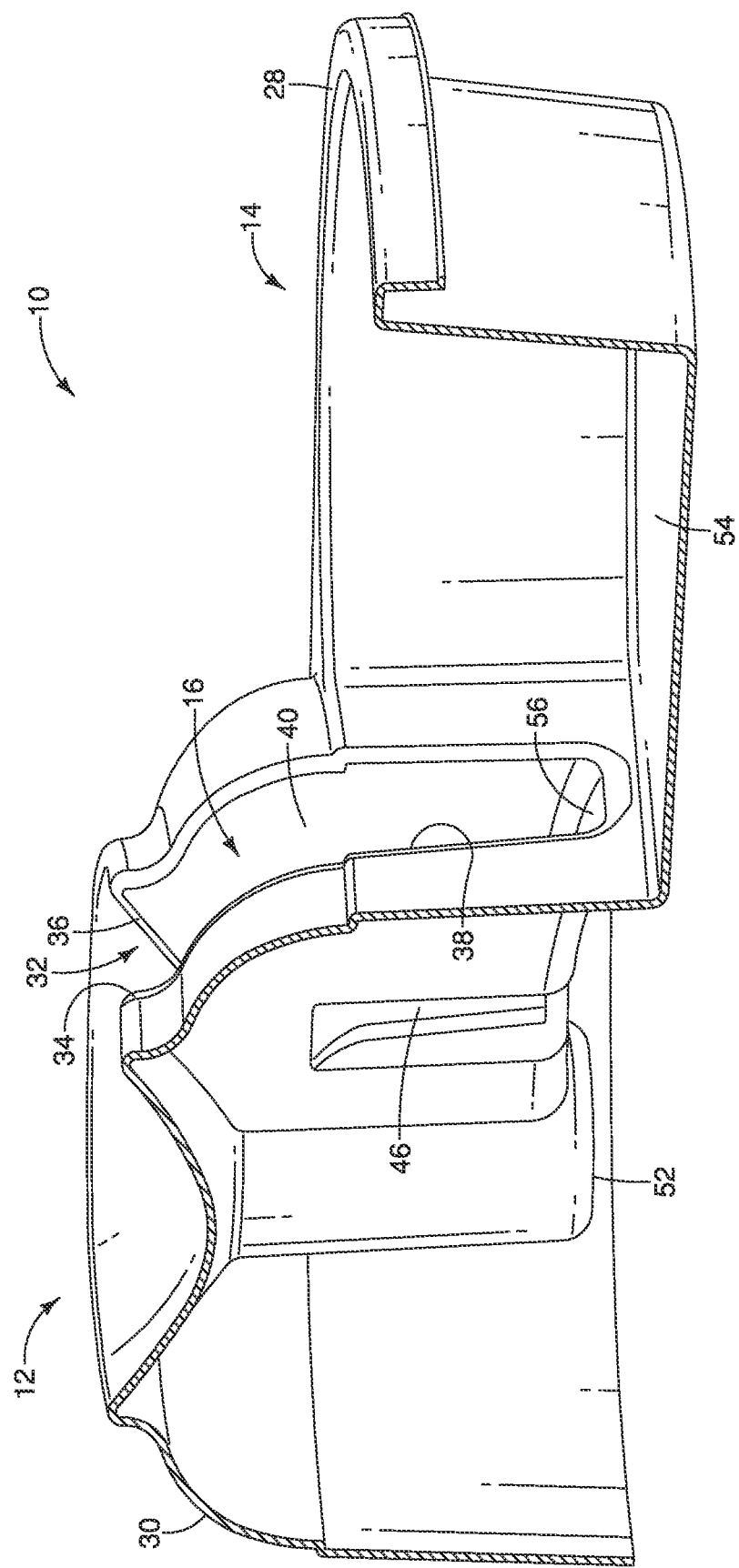
FIG. 7 is a cross-sectional view of the water dispenser taken along lines 7-7 in FIG. 5.

As illustrated in FIGS. 5 and 7, the channel 16 has the first and second sidewalls 38 and 40. The first and second sidewalls 38 and 40 extend from the nozzle receiving portion 18 to the bowl 14 to fluidly connect the nozzle receiving portion 18 and the bowl 14. The channel 16 further comprises a pair of first and second protrusions 46 and 48 extending from the first and second sidewalls 38 and 40 of the channel 16 towards each other. Preferably the first and second protrusions 46 and 48 extend from the first and second sidewalls 38 and 40 of the channel 16 to the first and second break walls 34 and 36 of the bottle collar 30. The first and second protrusions 46 and 48 are elongated protrusions that extend from the channel 16 to the bottle collar 30. As best seen in FIG. 4, a width of the channel 16 having the protrusions 46 and 48 has a maximum diameter M1 that is less than a maximum diameter M2 of the channel 16.

Preferably, the first and second protrusions 46 and 48 form a V-shape in the channel 16 to reduce the flow of fluid from the bottle support area 12 to the bowl 14. Also, the V-shape helps the water dispenser 10 of the illustrated embodiment to accommodate water bottles of different lengths. The first and second protrusions 46 and 48 define a minimum diameter of the channel 16. The first and second protrusions 46 and 48 serve to prevent overflow of water into the bowl 14.

As seen in FIG. 12, the first and second protrusions 46 and 48 taper away from each other in an upward direction. That is, the first and second protrusions 46 and 48 are wider adjacent to the bottom of the channel 16 than at the top of the channel 16. Moreover, the first and second protrusions 46 and 48 terminate prior to the top of the channel 16. The first and second protrusions 46 and 48 tapering increases towards the top of the channel 16 and terminates within the channel 16. The first and second protrusions 46 and 48 are disposed closer to the bottle support area 12 than to the bowl 14. In particular, the first and second protrusions 46 and 48 are positioned about one-third (⅓) along the channel 16 of the total length of the channel 16. This configuration is important to the reduction of turbulence produced when water flows from the water bottle to the bottle support area 12, through the channel 16 and into the bowl 14. Thus, the specific configuration of the first and second protrusions 46 and 48 led to unexpected results relative to a conventional channel 16 in the reduction or elimination of water turbulence.

This configuration of the first and second protrusions 46 and 48 not only reduces water flow through the channel 16, but the first and second protrusions 46 and 48 first and second protrusions 46 and 48 can also block debris from being sucked into the bottle.

The bowl 14 is fluidly connected to the bottle support area 12 to receive water from the bottle support area 12. The bowl 14 is designed to have a high bowl 14 height to accommodate several or large pets. The bowl 14 is defined by a sidewall that is tangent to a radius of the rim 28. That is, the sidewall of the bowl 14 preferably extends at an approximate right angle to the rim 28 to help maintain the water inside the bowl 14.

Figure 8:
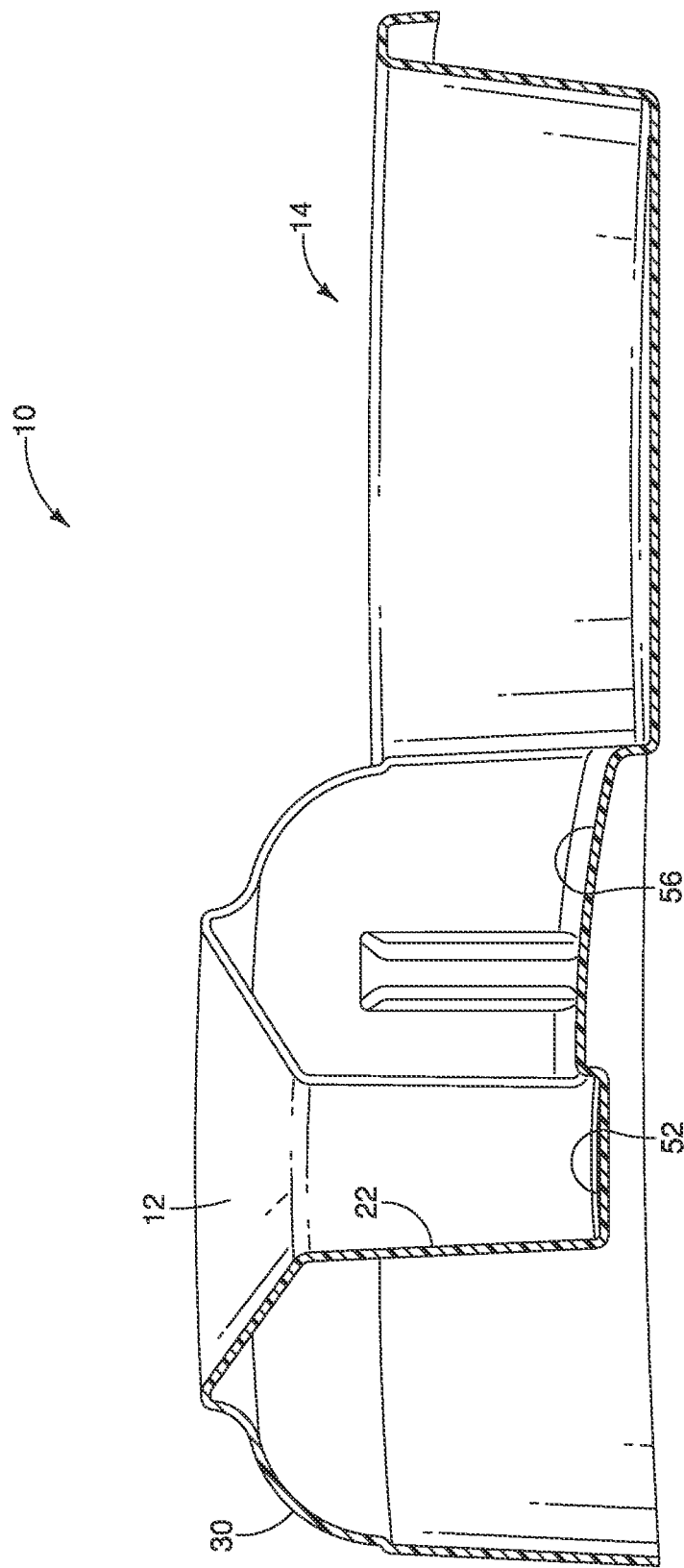
FIG. 8 is another cross-sectional view of the water dispenser taken along lines 8-8 in FIG. 5.

Referring now to FIGS. 7 and 8, the nozzle receiving portion 18 includes a first floor 52 of the water dispenser 10. The bowl 14 includes a second floor 54 of the water dispenser 10. The second floor 54 that is disposed lower than the first floor 52. The channel 16 includes a third floor 56 of the water dispenser 10. The third floor 56 extends between the first and second floors 52 and 54. In particular, the third floor 56 slopes downward from the first floor 52 to the second floor 54.

This configuration of a water dispenser provides a water dispenser that is usable with a variety of third party large water bottles, and avoids or eliminates water turbulence from the water bottle when placed in the water dispenser. Moreover, the water bottle of the present disclosure is more cost efficient to manufacture and easier to ship that conventional water dispensers.

General Interpretation of Terms

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the water dispenser. Accordingly, these terms, as utilized to describe the present invention should be interpreted relative to a vehicle equipped with the water dispenser.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A water dispenser, comprising:
   a bottle support area having a nozzle receiving portion defined by a circular sidewall that is configured to abut a nozzle of a water bottle;
   a bowl fluidly connected to the bottle support area; and
   a channel having a pair of first and second sidewalls extending from the nozzle receiving portion to the bowl to fluidly connect the nozzle receiving portion and the bowl, the channel having a maximum diameter that is less than a maximum diameter of the nozzle receiving portion, the channel further including a pair of first and second protrusions extending from the first and second sidewalls of the channel towards each other, the first and second protrusions defining a minimum diameter of the channel, a maximum width between the first and second protrusions being less than a maximum length of the channel;
   wherein the first and second protrusions are disposed closer to the bottle support area than to the bowl.

2. The water dispenser according to claim 1, further comprising
   an exterior wall connecting the bottle support area and the bowl, the exterior wall defining an outer sidewall wall of the bottle support area, the exterior wall also defining a rim of the bowl.

3. The water dispenser according to claim 2, wherein
   the bottle support area further includes a bottle collar extending upwardly from the outer sidewall wall of the bottle support area, the bottle collar having a radial break defined by a first break wall and a second break wall.

4. The water dispenser according to claim 3, wherein
   the first break wall of the bottle collar is integrally connected to the first sidewall of the channel, the second break wall is integrally connected to second sidewall of the channel.

5. The water dispenser according to claim 4, wherein
   the nozzle receiving portion includes a first floor of the water dispenser and the bowl includes a second floor of the water dispenser, the second floor being disposed lower than the first floor.

6. The water dispenser according to claim 5, wherein
   the channel includes a third floor of the water dispenser, the third floor extending between the first and second floors, and
   the third floor sloping downward from the first floor to the second floor.

7. The water dispenser according to claim 6, wherein
   the bottle support area further includes a tapering wall extending from the bottle collar to an inlet of the nozzle receiving portion.

8. The water dispenser according to claim 2, further comprising
   a pair of first and second interior reinforcement walls, the first interior reinforcement wall extending from an inside of the outer sidewall wall to the bowl from a first side of the outer sidewall wall, the second interior reinforcement wall extending from the inside of the outer sidewall wall to the bowl from a second side of the outer sidewall wall.

9. The water dispenser according to claim 1, wherein
   the bottle support area, the bowl and the channel are integrally molded as a one-piece member.

10. The water dispenser according to claim 1, wherein
    the first and second protrusions are wider adjacent to a bottom of the channel than at a top of the channel.

11. The water dispenser according to claim 1, wherein
    the first and second protrusions are positioned substantially one-third along the channel of the maximum length of the channel.

12. The water dispenser according to claim 1, wherein
the first and second protrusions together form a V-shape in the channel to reduce a flow of fluid from the bottle support area to the bowl,
the first and second protrusions taper away from each other in an upward direction such that the first and second protrusions are wider adjacent to a bottom of the channel than at a top of the channel, and
the first and second protrusions terminate prior to the top of the channel and the first and second protrusions tapering increases towards the top of the channel and terminates within the channel.

\* \* \* \* \*